Feb. 3, 1970  A. ROLON  3,493,282
ROTATABLE MIRROR SCANNING ASSEMBLY
Filed March 19, 1968  2 Sheets-Sheet 1

ARNALDO ROLON
*INVENTOR.*

BY William E. Johnson Jr
ATTORNEY

Feb. 3, 1970    A. ROLON    3,493,282
ROTATABLE MIRROR SCANNING ASSEMBLY
Filed March 19, 1968    2 Sheets-Sheet 2

ARNALDO ROLON
INVENTOR.

BY William E. Johnson Jr
ATTORNEY

United States Patent Office 3,493,282
Patented Feb. 3, 1970

3,493,282
ROTATABLE MIRROR SCANNING ASSEMBLY
Arnaldo Rolon, Houston, Tex., assignor to Dresser Systems, Inc., Dallas, Tex., a corporation of Delaware
Filed Mar. 19, 1968, Ser. No. 714,301
Int. Cl. G02b 17/00, 5/12; G02f 1/34
U.S. Cl. 350—7   3 Claims

ABSTRACT OF THE DISCLOSURE

A rotatable mirror assembly for use as an intermediate optical system for sweeping a laser beam repeatedly along an accurately predetemined line. The rotatable mirror assembly has a shaft including a rotational power source and has at least two mirrors supported for rotation by the shaft, the faces of each respective mirror being mounted on a L-shaped bracket having a pair of compound screws providing tilt and rotational adjustment of the bracket about a common pivot point.

BACKGROUND OF THE INVENTION

The present invention, generally, relates to a system for effecting optical transfer of information from a light source to a light sensitive medium. More particularly, the present invention relates to a new and improved mirror construction having a plurality of faces at precisely predetermined angles relative to each other so that each mirror face will reflect a fixed position light beam along substantially the same path.

Today, with the wide spread use of high speed data processing equipment, it is essential that the output equipment from a computer be as rapid and accurate as possible to receive and record the enormous quantity of data that flows from a computer. Computers have been used for several years in the geophysical prospecting field, particularly in processing seismic data developed by artificially inducing seismic disturbances, in an effort to locate petroleum and other minerals.

Optical recording systems and apparatus have been developed and improved for several years also, such improvements including the use of lasers. A laser (or optical maser) has been found to be particularly advantageous in that it admits of extremely high storage density of the recorded signals. This is possible because the high intensity light source of the laser produces a coherent light beam that may be focused to an extremely small spot on the surface of a recording medium.

In the past, mirrors to reflect the light beam, for example, from a laser, have been constructed having a plurality of faces at various angles. However, when it is desired to have the faces between two mirrors at a precisely predetermined angle, none of the prior art structures permit an exact setting within permissible tolerances.

Accordingly, it is the primary object of the present invention to provide a mirror construction which admits of minute adjustments to the angular settings between faces of a plurality of mirrors.

It is a further object of the invention to provide a new and improved mirror assembly having at least two faces at a precisely predetermined angle relative to each other.

A still further object of the invention is to provide a mirror assembly that may be rotated, the faces of such mirror assembly being at precisely predetermined angles relative to each other.

Another object of the present invention is to provide a new and improved mirror assembly having at least two faces at precisely predetermined angles relative to each other and relative to an axis of rotation.

The invention further resides in certain novel features of parts, and further objects and advantages thereof, will become apparent to those skilled in the art to which it pertains from the following description of the presently preferred embodiment described with respect to the accompanying drawings in which similar reference characters represent corresponding parts in the several views.

SUMMARY OF THE INVENTION

Briefly, a structure in accordance with the present invention includes a mirror assembly interposed between a laser light source and a recording medium, for example, a photographic film, and having a plurality of faces at a predetermined angle relative to each other. Means are provided within the assembly to exercise a very fine control over the rotational and tiltable adjustment of each of the mirror faces. The mirror assembly is rotatable and includes means to couple it to a rotational power source, for example, an electric motor. Constructed in this manner, the faces of the rotating mirror assembly will repeatedly reflect a light beam from the laser source along substantially the same path on the recording medium.

DESCRIPTION OF A PREFERRED EMBODIMENT

Figure 1:
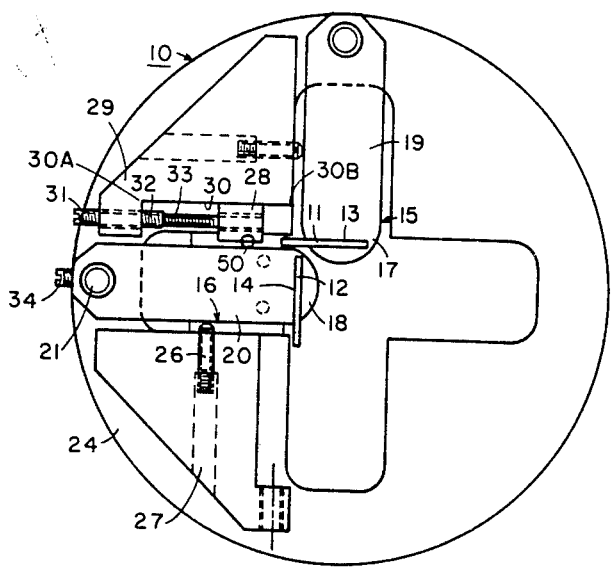
FIGURE 1 is a plan view of a mirror assembly constructed in accordance with the principles of the present invention.

Referring now to FIGURE 1 of the drawings, the numeral 10 identifies, generally, the mirror assembly of the present invention. Such mirror assembly 10 has a plurality of mirrors 11 and 12 having faces 13 and 14, respectively. The mirror 11 has a support 15, and the mirror 12 has a similar support 16.

Each L-shaped support 15 and 16 is formed with a vertically disposed bracket 17 and 18, respectively, and a horizontally disposed bracket 19 and 20, respectively. The vertical bracket 17 is formed integrally with the horizontal bracket 19, and the vertically disposed bracket 18 is similarly formed with its respective horizontal bracket 20, as is better illustrated in FIGURE 2.

These L-shaped brackets are formed of a suitable rigid material, such as steel, so that there is substantially no deflection relative to respective horizontal and vertical brackets.

The structure of the mirror assembly 10, shown in FIGURE 1, is adapted for four mirrors, although only two mirrors 11 and 12 are shown. While it is contemplated that all of the plurality of mirrors would be supported in a similar manner in the preferred embodiment, the description to follow in detail refers only to the mirror 12 and its support bracket 16 to avoid repetition.

Figure 2:
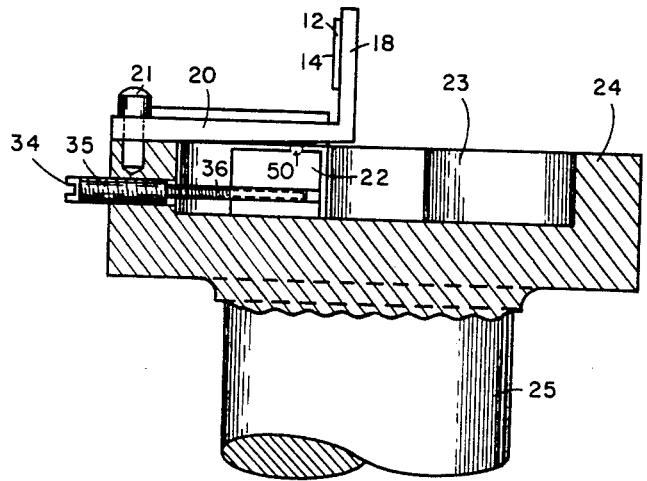
FIGURE 2 is a side view, partly in cross section, of the mirror assembly shown in FIGURE 1.

The horizontally disposed bracket 20 is pivotable about the axis of the screw 21, and it is deflected vertically, as viewed in FIGURE 2, by a block 22 supported slidably within a groove 23 in a circular table 24. A shaft 25 provides means for integrally connecting the table 24 rotatably with a suitable power source (not illustrated). Such a system as is described in copending application U.S. Ser. No. 577,259, filed Sept. 6, 1966, provides a suitable power source.

Referring back to FIGURE 1, the horizontally disposed bracket 20 is pressed against a set screw 26, which is accessible through an opening 27 for adjustment. Pressure is exerted against the opposite side of the bracket 20 from the set screw 26 by means of a slidable block 28. An angular boot 29 provides an inclined surface 30 against which the block 28 is slidable when a compound screw 31 is adjusted. The angle of inclination of surface 30 is so small as to be impractical to illustrate. Point 30B on the surface 30 is lower than point 30A, however, so that the bracket 20 is caused to rotate or pivot around the pivot screw 21 as the screw 31 is turned. It should be apparent to those skilled in the art that the bracket 20 could be inclined instead of the surface 30, the only requirement for the adjustment operation being that there be some relative angle of inclination between the surface 30 and the side of the bracket 20 in contact with the block 28.

The compound screw 31 extends threadedly through a portion of the boot 29, and different size threads engage the opposite end of the screw 31 with the block 28. For example, the thread of the compound screw 31 at the end 32 may be number 4–40 size, and the end 33 may be number 2–56 size.

With the above-exampled dimensions for the compound screw 31, each turn of the screw 31 represents a .025 inch movement in a direction parallel to the axis of the screw, and each turn of the end 33 represents a .01785 inch movement into the block 28. Accordingly, each turn of the compound screw 31 represents a movement of .00715 inch for the attached block 28, the movement of block 28 being the difference between the other two movements. By turning the screw 31 in a clock-wise manner, assuming both threads are right-handed, the threaded portion 32 advances through the boot 29 from left to right. This causes the threaded portion 33 to advance into the block 28, effectively causing block 28 to move to the left relative to the threaded portion 33, thus accounting for the movement of block 28 being the difference between the movement of threads 32 and 33. This provides an extremely fine adjustment of the pressure against the side of the bracket 20, and by a combination of adjustments through the opening 27 for the set screw 26 and by turns of the compound screw 31, the angular position of the mirror support 16 is adjustable with an extremely high degree of accuracy about the axis of the bolt 21.

The tilt of the mirror 12 is adjustable also with a similar degree of precision. Referring now to FIGURE 2 of the drawings, a compound screw 34 has ends 35 and 36 similarly constructed as the ends 32 and 33 of FIGURE 1. The horizontal bracket 20 has an extremely slight angle of inclination (exaggerated for purposes of illustration) so that movement of the block 22 by the screw 34 causes the bracket 20 to tilt up or down in relation to the pivot point 21. Thus, as the bracket 20 is tilted, the mirror 12 is similarly tilted. The block 22, as well as the block 28 in FIGURE 1, preferably has a bearing surface 50 for smoothness of adjustment.

Therefore, it may be seen that with the mirror 11 fixed in position, the face 14 of the mirror 12 may be adjusted in angular position relative to the face 13 of the mirror 11 by adjusting the compound screws 31 and 34, FIGURE 1. The accuracy of such adjustment has been found to exceed plus or minus 3 angular seconds.

Figure 3:
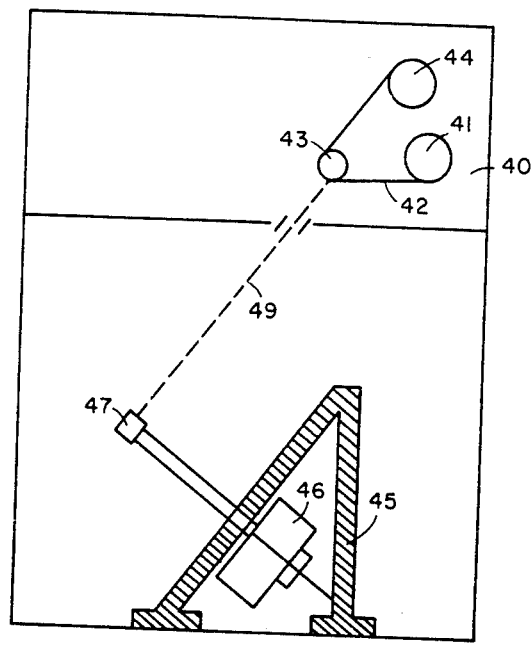
FIGURE 3 is a side view, in elevation, partly in cross section, indicating diagrammatically the environment in which the present invention is cast.
Figure 4:
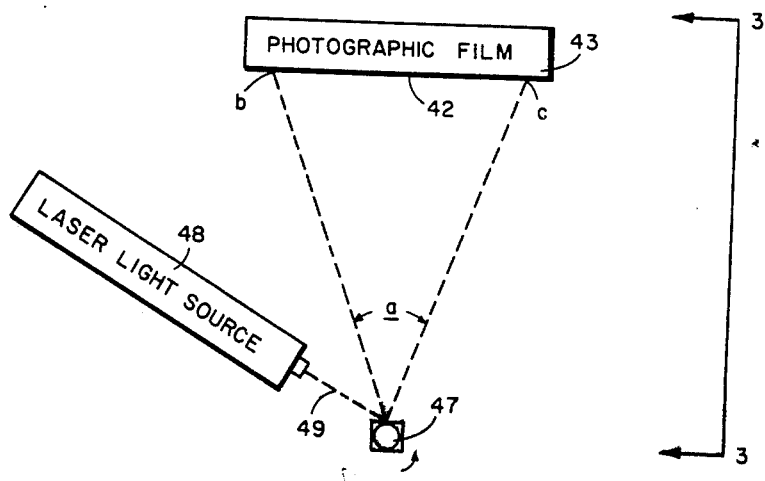
FIGURE 4 is an additional diagrammatic illustration of the structure shown in FIGURE 3.

The significance of obtaining such a high degree of accuracy will be understood better from a detailed description of the system depicted in FIGURES 3 and 4 of the drawings.

Referring now to FIGURE 3, the numeral 40 identifies a suitable light-tight housing to contain a magazine 41 of photographic film. The film 42 is fed from the supply cylinder 41 around a suitable guide 43 to a take-up container 44.

A structure 45 serves as a suitable support for a motor 46 to rotate a mirror assembly 47 at, for example, 300 revolutions per minute. A laser light source 48, FIGURE 4, is positioned on the opposite side of the mirror assembly 47 from that viewed in FIGURE 3, and therefore, is not visible in FIGURE 3. The numeral 49 represents the path of the laser light beam, and as better shown in FIGURE 4, the light beam leaves the laser source 48, is reflected from each face of the rotating mirror assembly 47 as each mirror face is presented to the beam and sweeps the beam in an angle $a$ across the film 42.

Such an angle $a$ may approximate 30 degrees in a preferred form of the invention, and with the mirror assembly 47 approximately 36 inches away from the photographic film 42, the distance $b$–$c$ would approximate 40 inches. With the mirror assembly 47 rotating at 300 revolutions per minute, the time for one sweep of the beam 49 across the 40 inch surface 42 would be approximately 1/60 of a second. As described in said copending application Ser. No. 577,259, it is desirable to be able to place dots of light information upon the photographic film within ±5 mils of a predetermined location, thus maintaining the resolution within 5 mils. It should be appreciated by those skilled in the art that such resolution requires extremely precise alignment of the mirror faces one with the other, and that the apparatus described herein provides a means for achieving such an alignment. While there has been illustrated and described an apparatus having a plurality of mirrors, those skilled in the art will recognize that an apparatus having one mirror bracket adjustable with respect to the axis of rotation of the shaft falls within the scope of the invention.

The embodiments of the invention in which an exclusive property or privilege is claimed are defined as follows:

1. A rotatable mirror assembly comprising:
   shaft means including means to couple one end of such means to a rotatable power source;
   a table integrally connected with a second end of said shaft means;
   at least one L-shaped bracket mounted on said table, said L-shaped bracket having a horizontal bracket and a vertical bracket, said horizontal bracket being rotatable about a pivot point on said table, and said vertical bracket having a mirror mounted thereon;
   first adjustment means carried by said table for adjusting the position of the mirror relative to the axis of rotation of said shaft, said first adjustment means including a compound screw and a sliding block member, said compound screw having a first segment threadedly engaged with said table and a second segment threadedly engaging said block member, said block member being in sliding engagement with said L-shaped bracket whereby rotation of said compound screw moves said block member along said L-shaped bracket to adjust the position of the mirror relative the axis rotation of said shaft; and
   second adjustment means including a compound screw and a sliding block member, said compound screw having a first segment threadedly engaged with said table and a second segment threadedly engaging said block member, said block member slidingly engaging the horizontal bracket to move said L-shaped bracket about said pivot point thereby adjusting the position of said mirror relative to said shaft.

2. A rotatable mirror assembly as set forth in claim 1 including a laser light source supported in a fixed position relative to said shaft means so that each of said mirrors mounted on each of said at least one bracket reflects a light beam from said laser along a predetermined path.

3. A rotatable mirror assembly as set forth in claim 2 including housing means with at least a portion thereof being light tight and means to support photographic film in said predetermined path.

References Cited

UNITED STATES PATENTS

| | | | |
|---|---|---|---|
| 904,066 | 11/1908 | Jacob | 350—287 |
| 1,750,785 | 3/1930 | Randall et al. | 350—299 |
| 3,154,371 | 10/1964 | Johnson | 350—7 X |
| 3,175,459 | 3/1965 | Smith et al. | 350—7 X |

FOREIGN PATENTS 860,115  1/1941  France.

PAUL R. GILLIAM, Primary Examiner

U.S. Cl. X.R.

178—7.6; 350—99, 285, 299